(12) United States Patent
McCann

(10) Patent No.: US 9,187,270 B2
(45) Date of Patent: Nov. 17, 2015

(54) APPARATUS FOR TRANSPORTING A QUANTITY OF LOST CIRCULATION MATERIAL AND METHODS OF MAKING AND USING SAME

(71) Applicant: Edward D. McCann, Edmond, OK (US)

(72) Inventor: Edward D. McCann, Edmond, OK (US)

(*) Notice: Subject to any disclaimer, the term of this patent is extended or adjusted under 35 U.S.C. 154(b) by 0 days.

(21) Appl. No.: 13/969,272

(22) Filed: Aug. 16, 2013

(65) Prior Publication Data

US 2013/0333797 A1 Dec. 19, 2013

Related U.S. Application Data

(63) Continuation of application No. 11/789,738, filed on Apr. 24, 2007, now abandoned, which is a continuation of application No. 10/943,387, filed on Sep. 17, 2004, now abandoned.

(60) Provisional application No. 60/504,096, filed on Sep. 19, 2003.

(51) Int. Cl.
| | |
|---|---|
| *B65G 67/24* | (2006.01) |
| *F04B 17/00* | (2006.01) |
| *F04B 17/02* | (2006.01) |
| *F04B 17/03* | (2006.01) |
| *F04D 23/00* | (2006.01) |
| *F04B 17/06* | (2006.01) |
| *E21B 33/138* | (2006.01) |

(52) U.S. Cl.
CPC .............. *B65G 67/24* (2013.01); *E21B 33/138* (2013.01); *F04B 17/02* (2013.01); *F04B 17/03* (2013.01); *F04B 17/06* (2013.01); *F04D 23/001* (2013.01); *F04B 17/006* (2013.01)

(58) Field of Classification Search
CPC ..... E21B 21/003; E21B 33/138; B65G 67/24; F04B 17/00; F04B 17/06; F04B 17/03; F04D 23/001
USPC ......... 166/294; 137/565.01; 175/72; 141/231
See application file for complete search history.

(56) References Cited

U.S. PATENT DOCUMENTS

| | | | | |
|---|---|---|---|---|
| 1,953,091 | A * | 4/1934 | Wesberg et al. | 366/11 |
| 3,568,782 | A * | 3/1971 | Cox | 175/72 |
| 3,757,491 | A * | 9/1973 | Gourdine | 96/27 |
| 4,512,405 | A * | 4/1985 | Sweatman et al. | 166/278 |
| 4,580,928 | A * | 4/1986 | Van Abbema | 406/109 |
| 6,630,429 | B1 * | 10/2003 | Cremeans et al. | 507/104 |

* cited by examiner

*Primary Examiner* — Daniel P Stephenson
(74) *Attorney, Agent, or Firm* — Dunlap Codding, P.C.

(57) ABSTRACT

The present invention relates generally to systems and methods for transporting quantities of lost circulation material. The system includes at least one pump, at least one intake assembly, at least one exhaust assembly, and can also include at least one intake member operably connected to the intake assembly, and at least one exhaust member operably connected to the exhaust assembly.

1 Claim, 3 Drawing Sheets

APPARATUS FOR TRANSPORTING A QUANTITY OF LOST CIRCULATION MATERIAL AND METHODS OF MAKING AND USING SAME

CROSS REFERENCE TO RELATED APPLICATIONS

This application is a continuation of U.S. Ser. No. 11/789,738, filed on Apr. 24, 2007, which is a continuation of U.S. Ser. No. 10/943,387, filed Sep. 17, 2004, which claims the benefit of the entirety of U.S. Provisional Application Ser. No. 60/504,096, filed Sep. 19, 2003; the entire contents of each application are hereby expressly incorporated herein by reference.

BACKGROUND OF THE INVENTION

1. Field of the Invention

The present invention generally relates to a system and methods for efficiently and safely transporting a quantity of lost circulation material to a predetermined location by employing a novel conveying system.

2. Background of the Related Art

In the field of drilling, drill rigs are typically of the rotary rig type. Rotary drill rig usually includes multiple engines that supply power hoisting equipment that raise and lower a drill string, and rotary equipment that turn the drill string and a drill bit attached to the end of the drilling string. These engines also power the circulation equipment that pumps drilling fluids down hole to lubricate the drill string and drill bit.

The drilling crew is under the supervision of a driller who operates the drilling and hoisting equipment. The person who works on a platform, high in the derrick, is called a derrickman. The derrickman's job is to handle the upper part of the drill stem as it is raised and lowered out/into the hole. The workers who work on the drill floor are called rig workers or roughnecks. Their job is to perform general labor and add new pipe joints as the well is drilled. All of these personnel and the entire operation of the drill rig is under the supervision of a person called a tool pusher. A typical drill rig will operate 24 hours per day, 7 days per week.

In the field of hydrocarbon exploration and more specifically, during the drilling of wells to recover oil and gas it is necessary to circulate the drilling fluid down the hollow drilling pipe to the bottom of the well bore and back up the well bore to the surface. This drilling fluid keeps the geologic formations (dirt, rock, voids, air pockets, etc.) surrounding the well bore in place and enhances and/or maintains the ability to move the drill pipe up and down within the well bore. Drilling fluids of different weights and viscosities are required depending upon the depth of the well, the geologic formations encountered and the diameter of the well bore. For example, in the Oklahoma and Texas panhandle, the dolomite and other underground geological formations are much more fractured than in other areas of the world. Such fractures lead or require a drilling fluid (and one preferably having a lost circulation material added thereto) capable of bridging and/or sealing off the fractured zone such that the drilling fluid is not lost through such fractures.

Operation of rotary drilling equipment involves rotating a drill bit by means of a hollow pipe. The drilling fluid circulates down the hollow pipe, through the bit, and back to the surface through the annular space between the outside of the drill pipe and the inside of the drilled hole or casing. The drilling fluid performs many functions in rotary drilling operations including, but not limited to: 1) remove formation cuttings from the drilled hole; 2) suspend cuttings during trips; 3) form an impermeable wallcake; 4) prevent caving of the formation; and 5) control of formation pressure.

Consequently during the drilling of an oil and gas well, it is necessary to continuously monitor the drilling fluid and change the physical characteristics and properties of the drilling fluid as new situations are encountered. These physical characteristics include the addition of lost circulation material. The function of lost circulation material (or "LCM") is to seal off porous or fractured formations encountered while drilling oil and gas wells. In this manner, the LCM serves the purpose of filling in or "packing" the voids to ensure that drilling fluid is not lost or siphoned off through the voids and away from the well bore.

A typical drilling fluid system for an oil and gas well drilling rig includes a holding tank, usually positioned at the well surface (on or adjacent to the drilling rig) and a network of pumps, mixers, and supply lines that run to and from the well bore. In some situations, the holding tank may be positioned substantially adjacent the well bore. The location of the holding tank is thus widely variable and dependent upon historical preference and/or space limitations at the well site.

The holding tank is used to hold the various dry and liquid components of the drilling fluid as they are mixed into a slurry to produce a drilling fluid of the desired physical properties and characteristics. The drilling fluid is then pumped from the holding tank through the supply lines and circulated through the well bore at the desired rate.

The physical characteristics and properties of the drilling fluid are altered by the addition of liquids (such as water) powder and other types of lost circulation materials. Oftentimes, the drilling fluid is simply mud that has water or other materials added to it. These lost circulation materials are typically packaged in burlap or paper bags weighing up to one hundred pounds each. Bags of lost circulation materials are manually loaded in a storage area on the rig or at the well site in an out-of-the-way location. When needed, the bags of lost circulation materials are typically carried by the rig workers to the holding tank. The lost circulation materials are then manually dumped by the rig workers into the holding tank. Manually carrying and dumping the bags is physically demanding and oftentimes dangerous and fatiguing to the rig worker. Further, the method requires a significant amount of manpower to accomplish the task especially when it is necessary to rapidly add bags of lost circulation material to the drilling fluid to change its physical properties in response to an encountered geologic situation. There are many types of LCM utilized in the oil and gas industry. Examples of LCM's include: cottonseed hulls, cedar fiber, paper, cottonseed burrs, sawdust, cellophane, calcium carbonate, phenolic plastic, and many others. These lost circulation materials vary in size and bridging characteristics (i.e., their ability to lock together and not flow into and through the fracture). If a lost circulation material has a high bridging characteristic, its particles are typically of varying size and act similar or cause a cement like effect by filling up (i.e., bridging) the fracture thereby stopping any potential loss of drilling fluid. It is seldom known what size geologic voids or openings drilling fluid is being lost to. And, therefore, a mixture of particle sizes is more effective. Local availability or preference may also determine the lost circulation material used at any given location.

Because of the physical demands of lifting and carrying the bags of LCM, the rig workers are subject to physical injury and heat exhaustion. In addition, loading, carrying, and dumping of the bags may expose the rig worker to the dust and fumes generated by the dry powdered materials typically contained in the bags and may create a hazardous environmental risk to the rig workers. For example, the inhalation of LCM may be carcinogenic often time. Further, an environmental waste disposal problem is created by the used empty paper bags remaining after the lost circulation material is dumped in the mud system.

In addition to the physical and environmental risks associated with storing and handling lost circulation materials in bags, these types of bags impose significant storage problems at the drilling site. Bag storage typically requires a great deal of space, and storage space is especially valuable in a drilling installation where drilling platform space is finite and often quite limited. Consequently, sufficient bag storage space on a drilling rig is often unavailable or inconveniently located, especially in situations where it is necessary to have on hand, at the well site, a wide variety of different types of components available for use in the drilling mud system. Inconvenient storage space makes it especially difficult to manually move the bags from storage to the mud system. Therefore, a need exists for systems and methods of easily, efficiently and safely transporting lost circulation materials to the drilling fluid holding tank at a well site.

DETAILED DESCRIPTION OF THE DRAWINGS

Figure 1:
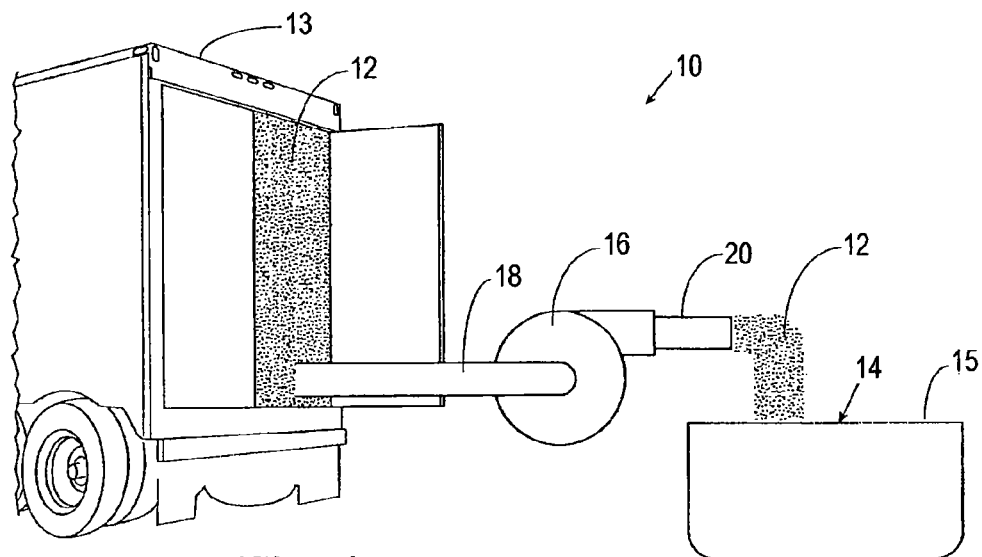
FIG. 1 is a perspective view of a system for transporting lost circulation material.

Before explaining at least one embodiment of the invention in detail, it is to be understood that the invention in not limited in its application to the details of construction and the arrangement of the components set forth in the following description or illustrated in the drawings. The invention is capable of other embodiments or of being practiced or carried out in various ways and as such all such embodiments and/or equivalents are to be considered as being encompassed within the scope and description of the present invention. Also, it is to be understood that the phraseology and terminology employed herein is for purpose of description and should not be regarded as limiting.

Referring now to FIG. 1 shown therein is a system 10 for transporting a quantity of lost circulation material 12 to a predetermined location 14. The lost circulation material 12 is shown in FIG. 1 as being transported in bulk to a well drilling site and stored in bulk in a truck 13. One of ordinary skill in the art would realize that the truck 13 is only used for purpose of explanation and that any receptacle, tank, or other storage assembly could be used to hold the lost circulation material 12. In a preferred embodiment, the predetermined location 14 is a drilling fluid storage tank 15. The system 10 includes a pumping assembly 16, an intake assembly 18, and an exhaust assembly 20. In operation, the intake assembly 18 is disposed in proximity to the quantity of lost circulation material 12 and the exhaust assembly 20 is disposed in proximity to the predetermined location 14 (i.e., the exhaust assembly 20 is placed proximate to the location where the lost circulation material is to be transported.) The pump assembly 16 is then activated such that the quantity of lost circulation material 12 is drawn into the intake assembly 18, pumped through the pump assembly 16, and discharged out of the exhaust assembly 20 thereby efficiently, safely and quickly transporting the lost circulation material 12 to the predetermined location 14.

Figure 2:
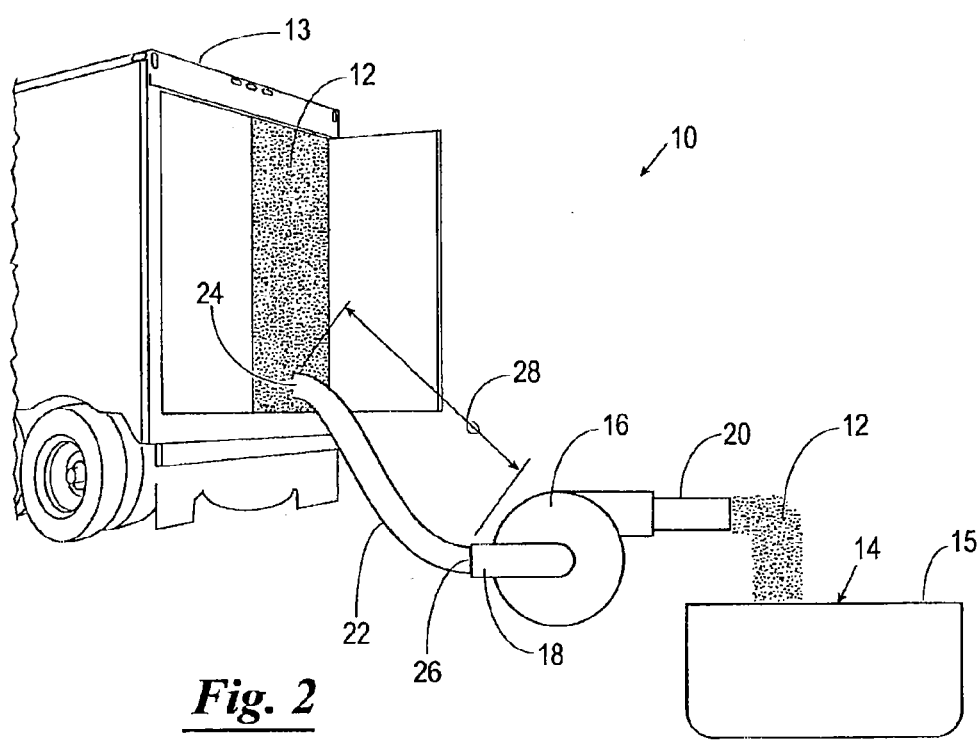
FIG. 2 is a perspective view of the system of FIG. 1 further including an intake member.

Referring now to FIG. 2 the intake assembly may also include an intake member 22 that has a first end 24, a second end 26 and a length 28 extending between the first end 24 and the second end 26 of the intake member 22. In this embodiment of the system 10, the first end 24 of the intake member 22 is disposed in proximity to the quantity of lost circulation material 12 and the second end 26 of the intake member 22 is integrally and operably connected to the pump assembly 16 such that the quantity of lost circulation material 12 is drawn into the first end 24 of the intake member 22 through the length 28 of the intake member 22 and out of the second end 26 of the intake member 22 passed through the pump assembly 16 and discharged out of the exhaust assembly 20 thereby transporting the quantity of lost circulation material 12 to the predetermined location 14.

Figure 3:
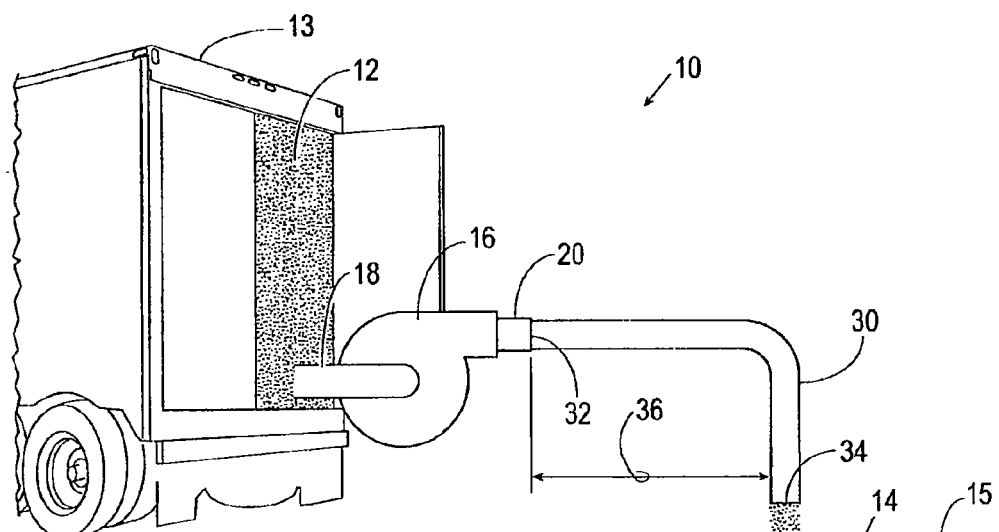
FIG. 3 is a perspective view of the system of FIG. 1 further including an exhaust member.

Referring now to FIG. 3, the exhaust assembly 20 may also include an exhaust member 30 having a first end 32, a second end 34, and a length 36 extending between the first end 32 and the second end 34 of the exhaust member 30. In this embodiment of the system 10, the first end 32 of the exhaust member 30 is integrally and operably connected to the pump assembly 16 and the second end 34 of the exhaust member 30 is disposed proximate to the predetermined location 14 where the quantity of lost circulation material 12 is to be transported. In operation, the pump assembly 16 is activated such that the quantity of lost circulation material 12 is drawn into the intake assembly 18 passed through the pump assembly 16, discharged out of the pump assembly 16 into the first end 32 of the exhaust member 30, passed through the length 36 of the exhaust member 30 and discharged out the second end 34 of the exhaust member, thereby transporting the quantity of lost circulation material 12 to the predetermined location 14.

Figure 4:
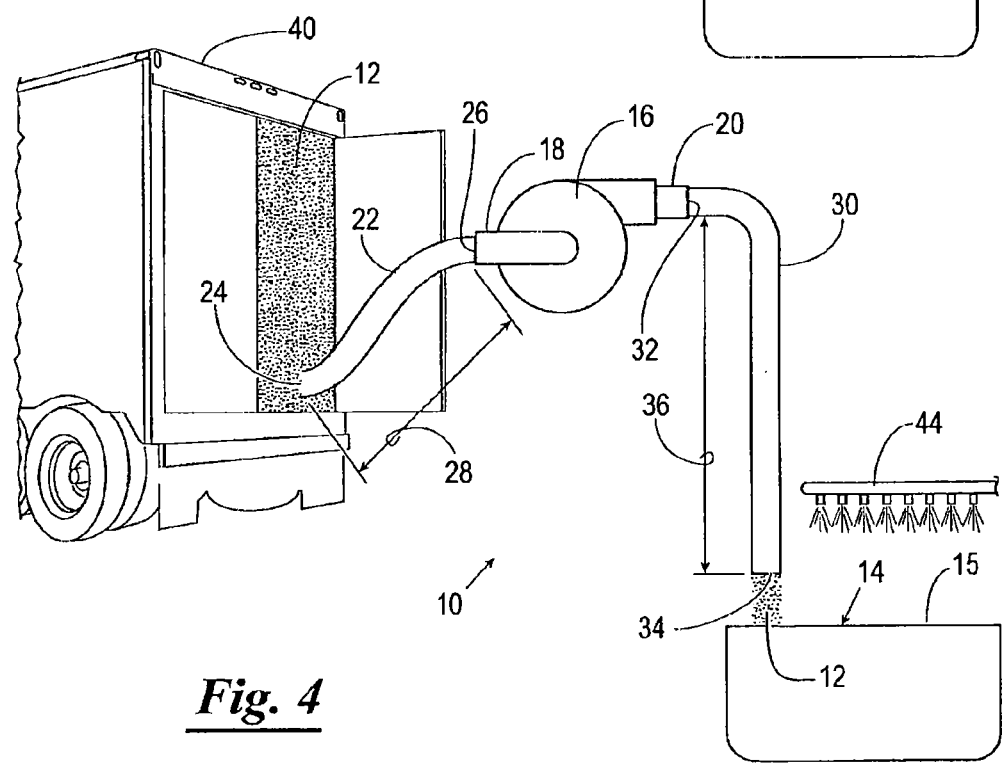
FIG. 4 is a perspective view of the system of FIG. 1 including both the intake member of FIG. 2 and the exhaust member of FIG. 3.
Figure 4A:
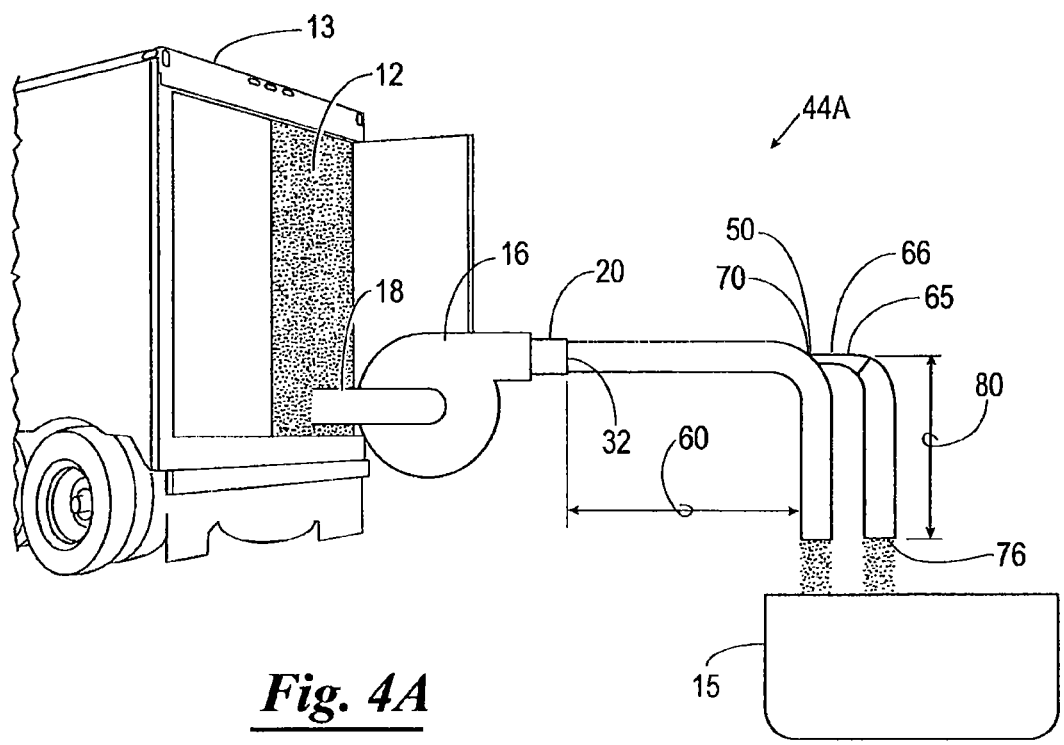
FIG. 4A is a perspective view of a mister operably connected to a pump assembly.

Referring now to FIG. 4, the pump assembly 16 includes both the intake member 22 having the first end 24, the second end 26 and the length 28 and the exhaust member 30 having the first end 32, the second end 34, and the length 36. In this embodiment of the system 10, the first end 24 of the intake member 22 is disposed in proximity to the quantity of lost circulation material 12, the second end 26 of the intake member 22 is operably connected to the pump assembly 16, the first end 32 of the exhaust member 30 is also operably connected to the pump assembly 16 and the second end 34 of the exhaust member 30 is disposed in proximity to the predetermined location 14. In operation, the pump assembly 16 is activated such that the quantity of lost circulation material 12 is drawn into the first end 24 of the intake member 22, through the length 28 of the intake member 22, out of the second end 26 of the intake member 22, into the pump assembly 16, passed through the pump assembly 16 and out of the pump assembly 16, into the first end 32 of the exhaust member 30, through the length 36 of the exhaust member 30 and out the second end 34 of the exhaust member 30 to the predetermined location 14 thereby transporting the lost circulation material.

It should be noted that the intake member 22 and the exhaust member 30 can be made from any tubing, duct, hose or pipe that is capable of transporting the lost circulation material 12. Preferably, the tubing, duct, hose or pipe is flexible and collapsible for ease of handling and storage. The intake member 22 and exhaust member 30 can be combinations and derivations of tubing, duct, hose and pipe. A plurality of lengths of tubing, duct, hose and pipe may also be joined together via fasteners or bonding material to form the intake member 22 or the exhaust member 30.

The pump assembly 16 can be any type of pump, such as a centrifugal pump or positive displacement pump, capable of drawing the quantity of lost circulation material 12 through the intake member 22 into the intake assembly 18 and propelling the quantity of lost circulation material 12 out the exhaust assembly 20 and through the exhaust member 30 to the predetermined location 14. The pump assembly 16 can be powered via an internal combustion engine or an AC or DC electric motor or the pump assembly 16 can be powered by solar or wind derived renewal energy resources. Alternatively, the pump assembly 16 could be powered by the combustion of natural gas released by the process of running the well drilling equipment. The pump assembly 16, the intake member 22, and exhaust member 30 are designed to be coordinated such that the pump assembly 16 is sufficiently powered to transport the lost circulation material 12 to the predetermined location 14 but not so over-powered as to damage the intake member 22 and the exhaust member in the process of transporting the lost circulation material 12.

Typically, the lost circulation material 12 is a quantity of cottonseed hulls; however, the quantity of lost circulation material 12 can be fiber, paper, sawdust, cellophane, calcium carbonate, phenolic plastic or any other type of lost circulation material known in the art, or combinations and derivations of such materials. The predetermined location 14 to which the quantity of lost circulation material 12 is transported is typically the drilling fluid holding tank 15 which, in actual operation, may be what is referred to as a mud pit or mixing hopper of a hydrocarbon drilling system.

Referring again to FIG. 4 the quantity of lost circulation material 12 can be stored in a container 40 that is placed in proximity to the first end 24 of the intake member 22. The container 40 can be, as an example but not by way of limitation, a drum or a metal or plastic barrel and/or a portable trailer or even a tractor trailer. Preferably, the container 40 is a portable trailer or tractor trailer thereby reducing the transportation and the environmental waste disposal problems associated with bags and barrels. The quantity of lost circulation material 12 disposed in the container 40 can be assisted into the intake member 22 via an operator using his hands or any tool convenient for shoveling or transporting the quantity of lost circulation material 12 into the first end 24 of the intake member 22. The system 10 for transporting lost circulation material can also include a mister 44 operably connected to a fluid source. The mister 44 is located near the second end 34 of the exhaust member 30. The mister 44 is for aerosolizing a quantity of fluid with air in order to reduce the ambient air bound particles (i.e., dust) of lost circulation material 12 as the particles of the lost circulation material 12 exit the exhaust assembly 20 or exhaust member 30 and enter the predetermined location 14—such as the drilling fluid storage tank 15 (i.e., the mud pit or hopper of the hydrocarbon drilling system.)

An alternate embodiment of the mister 44 is shown in FIG. 4A and designated generally as mister 44*a*. The mister 44*a* has a first end 50 and a second end 55 and a length 60 extending between the first end 50 and the second end 55 of the mister 44*a*. The mister 44*a* also has a fluid port assembly 65 that is integral with the mister 44*a*. The fluid port assembly 65 includes a hollow tube 66 that has an open first end 70 and an open second end 76 and a length 80 extending between the open first end 70 and the open second end 76. The open second end 76 of the fluid port assembly 65 is disposed in proximity to or in contact with a fluid, such as the drilling fluid in the holding tank. The open first end 70 of the fluid port assembly 65 is operably connected to the exhaust member 30 of the exhaust assembly 20 such that as the lost circulation material 12 flows past the first end 70 of the fluid port assembly 65, the fluid in proximity or contact with the open second end 76 of the fluid port assembly 65 is drawn into the open second end 76 of the fluid port assembly 65 through the length 60 of the mister 44*a* and combined with the lost circulation material 12 thereby reducing ambient or bound particles.

From the above description it is clear that the present invention is well adapted to carry out the objects and obtain the advantages mentioned herein as well as those inherent in the invention. While preferred embodiments of the invention have been described for the purposes of this disclosure, it will be understood that numerous changes may be made which will readily suggest themselves to those skilled in the art which accomplish within the spirit of the invention disclosed and as defined in the appended claims.

What is claimed is:

1. A method for depositing a lost circulation material into a drilling fluid holding tank, comprising:

transporting a storage vessel containing a bulk quantity of lost circulation material to a well drilling site;

storing the quantity of lost circulation material in the storage receptacle at the well drilling site; and conveying a selected quantity of the bulk quantity of lost circulation material directly from the storage receptacle into the drilling fluid holding tank by:

positioning a distal end of a flexible intake hose in the storage receptacle such that the distal end of the flexible intake hose is in proximity to the quantity of lost circulation material;

positioning a distal end of a flexible exhaust hose in proximity to the drilling fluid holding tank;

positioning an open second end of a fluid port assembly in fluid communication with a fluid contained in the drilling fluid holding tank, the fluid port assembly having a first open end operably connected to the flexible exhaust hose; and activating a pump assembly interposed between the flexible intake hose and the flexible exhaust hose such that the lost circulation material is drawn into the flexible intake hose and discharged from the flexible exhaust hose into the drilling fluid holding tank and the fluid from the drilling fluid holding tank is drawn from the drilling fluid holding tank through the fluid port assembly and discharged on the lost circulation material in the flexible exhaust hose as an aerosolized fluid.

* * * * *